United States Patent
Yamagata et al.

(10) Patent No.: US 8,767,891 B2
(45) Date of Patent: Jul. 1, 2014

(54) RECEPTION SIGNAL INTEGRATING METHOD AND RECEIVER

(75) Inventors: Yoshitaka Yamagata, Matsumoto (JP); Norio Teruuchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 573 days.

(21) Appl. No.: 12/973,851

(22) Filed: Dec. 20, 2010

(65) Prior Publication Data

US 2011/0158289 A1   Jun. 30, 2011

(30) Foreign Application Priority Data

Dec. 25, 2009   (JP) .................................. 2009-294831

(51) Int. Cl.
   *H04L 27/06*   (2006.01)
   *H03D 1/00*   (2006.01)

(52) U.S. Cl.
   USPC ........... 375/343; 375/136; 375/147; 375/316; 375/324; 375/340

(58) Field of Classification Search
   USPC .................. 375/136, 147, 316, 324, 340, 343
   See application file for complete search history.

(56) References Cited

U.S. PATENT DOCUMENTS

| | | | |
|---|---|---|---|
| 6,996,375 B2 * | 2/2006 | Dent et al. .................. | 455/67.16 |
| 7,423,564 B2 * | 9/2008 | Kitayama et al. ............. | 341/137 |
| 7,570,206 B2 * | 8/2009 | Uchida ..................... | 342/357.69 |
| 2002/0055335 A1 * | 5/2002 | Wakabayashi ............... | 455/67.1 |

FOREIGN PATENT DOCUMENTS

| | | |
|---|---|---|
| JP | 62-132186 A | 6/1987 |
| JP | 2002-524748 A | 8/2002 |
| JP | 2007-256111 A | 10/2007 |
| WO | 00/14568 A1 | 3/2000 |

\* cited by examiner

*Primary Examiner* — Ted Wang

(74) *Attorney, Agent, or Firm* — Kilpatrick Townsend & Stockton LLP

(57) ABSTRACT

A reception signal integrating method includes: calculating, in receiving a satellite signal, when a reception signal of the satellite signal is time-divided at an assumed period obtained by estimating code period time of a spread code of the satellite signal, a coefficient representing a period shift between a true period and the assumed period of the spread code using first portions and second portions having an assumed period different from that of the first portions in the reception signal; and integrating the reception signal using the coefficient.

8 Claims, 10 Drawing Sheets

RECEPTION SIGNAL INTEGRATING METHOD AND RECEIVER

BACKGROUND

1. Technical Field

The present invention relates to a reception signal integrating method and a receiver.

2. Related Art

As a positioning system that utilizes a positioning signal, a GPS (Global Positioning System) is widely known. The GPS is used in a GPS receiver incorporated in a cellular phone, a car navigation system, and the like. The GPS receiver performs location calculation processing for calculating, on the basis of information such as the locations of plural GPS satellites and pseudo distances from the GPS satellites to the receiver, three-dimensional coordinate values indicating the location of the receiver and a clock error.

A GPS satellite signal is a type of a communication signal spread and modulated in a CDMA (Code Division Multiple Access) system conventionally known as a spread spectrum modulation system. As a method generally used in acquiring the GPS satellite signal from a reception signal, there is a method of performing correlation processing for the reception signal and a replica signal of a CA (Coarse and Acquisition) code, which is a spread code of the GPS satellite signal, while changing a frequency and a code phase (so-called correlation operation of a frequency direction and a phase direction; also referred to as frequency search and phase search) to determine a frequency and a code phase (e.g., JP-A-2007-256111).

In an environment in which the reception signal of the GPS satellite signal is in a weak electric field (e.g., an indoor environment; hereinafter referred to as "weak electric field environment"), since the reception signal is feeble, a difference does not appear in correlation values obtained by performing the correlation processing and, in some case, a peak of the correlation values is unknown. Therefore, a method of facilitating discrimination of the peak of the correlation values by performing, in the weak electric field environment or the like, integrating the reception signal over a predetermined period and performing the correlation processing for the integrated signal is used.

A carrier frequency of the GPS satellite signal is 1.57542 [GHz]. The CA code, which is the spread code of the GPS satellite signal, is a pseudo random noise code having a repetition period of 1 ms with a code-length 1023 chip set as a 1PN frame. A chip rate of the CA code is 1.023 [MHz]. Therefore, theoretically, the number of periods of a carrier wave per one chip is 1540. The number of periods per one code period of the CA code is 1540×1023=1,575,420.

However, a reception frequency in actual reception of the GPS satellite signal includes frequency errors due to a so-called Doppler frequency and an error of a local clock (a clock error). Because of the presence of these frequency errors, a code period estimated on a receiver side as one period of the CA code that should originally be a repetition period of 1 ms (this period is hereinafter referred to as "assumed period") deviates from a true period. At every 1,575,420 periods of the carrier wave, a period of the CA code is one code period. This period is the "true period". However, the receiver does not count a period of the carrier wave to determine a code period. The receiver assumes and determines the code period without counting the period of the carrier wave. More specifically, the receiver determines a frequency to equivalently assume the code period without directly assuming the code period.

Therefore, when the reception signal is time-divided, the carrier wave is not always time-divided at exactly the 1,575,420 periods and a some shift of a phase occurs. In other words, since the carrier wave is time-divided by assuming the code period, a shift occurs between a phase of the carrier wave at the start point of a certain code period and a phase of the carrier wave at the start point of the next code period (this shift is hereinafter referred to as "period shift"). The period shift is equivalent to a shift between the true period and the assumed period of the CA code. As explained above, the assumption of the code period can be synonymous with calculation of a reception frequency. Since the frequency errors are included in the reception frequency, the period shift occurs.

Even if it is attempted to integrate the reception signal in order to facilitate discrimination of a peak of the correlation values in the weak electric field environment, when the reception signal is integrated in a state in which the period shift occurs, in some case, the amplitude of the reception signal decreases on the contrary. This is because, when a signal is integrated while a period cannot be accurately grasped, a phase of the signal to be integrated shifts and it is likely that the signal with plus and minus of amplitude reversed is integrated. When the reception signal is integrated and the correlation processing is performed in a state in which the period shift occurs, it is also likely that a discriminated peak of correlation values is not a correct result.

SUMMARY

An advantage of some aspects of the invention is to propose an appropriate reception signal integrating method that takes into account the period shift.

According to a first aspect of the invention, there is provided a reception signal integrating method including: calculating, in receiving a satellite signal, when a reception signal of the satellite signal is time-divided at an assumed period obtained by estimating code period time of a spread code of the satellite single, a coefficient representing a period shift between a true period and the assumed period of the spread code using first portions and second portions having an assumed period different from that of the first portions in the reception signal; and integrating the reception signal using the coefficient.

According to the first aspect, when the reception signal of the satellite signal is time-divided at the assumed period of the spread code of the satellite signal, the coefficient representing the period shift between the true period and the assumed period of the spread code is calculated by using the first portions and the second portions having the assumed period different from that of the first portions in the reception signal. The reception signal is integrated by using the coefficient.

The period shift is a difference between the true period and the assumed period of the spread code of the satellite signal. As explained in detail later, the inventor found that it is possible to calculate the coefficient (an index) representing the period shift by using a reception signal portion having a different assumed period in a reception signal portion obtained by time-dividing the reception signal of the satellite signal at the assumed period of the spread code. It is possible to obtain an appropriate integrated reception signal, which takes into account the period shift, by integrating the reception signal using the coefficient.

As a second aspect of the invention, in the reception signal integrating method according to the first aspect, the integrating the reception signal may be generating, by multiply accumulating the first and second portions and the coefficient, a signal obtained by integrating the reception signal.

According to the second aspect, the signal obtained by integrating the reception signal is generated by multiply accumulating the first and second portions and the coefficient. It is possible to remove an error component due to the period shift by multiplying the reception signal portion with the coefficient. Therefore, the signal obtained by integrating the reception signal is a high-quality signal in which signal deterioration due to the period shift does not occur.

As a third aspect of the invention, in the reception signal integrating method according to the first or second aspect, the calculating the coefficient may include calculating the coefficient concerning each of the second portions different by a plurality (n; n is a natural number) of the assumed periods in the reception signal. The integrating the reception signal may include integrating, in integrating each of the second reception signal portions different by the plurality (n) of the assumed periods, the second reception signal portion using the coefficient corresponding thereto.

According to the third aspect, the coefficient concerning each of the second portions different by the plurality (n) of the assumed periods of the spread code is calculated. When each of the second portions different by the plurality (n) of the assumed periods is integrated, the second portion is integrated by using the coefficient corresponding thereto. Since the plural reception signal portions are integrated by using the coefficient, it is possible to obtain a higher-quality integrated signal.

As a fourth aspect of the invention, in the reception signal integrating method according to any one of first to third aspects, the calculating the coefficient may include calculating the coefficient using signal portions at the same timings in the assumed period in the first portions and the second portions.

According to the fourth aspect, the coefficient is calculated by using the signal portions at the same timings in the assumed period in the first and second reception signal portions. Since the signal portions at coinciding timings in the assumed period are used, it is possible to appropriately calculate the coefficient.

As a fifth aspect of the invention, in the reception signal integrating method according to any one of the first to fourth aspects, the calculating the coefficient may include calculating the coefficient by multiplying together the first portions and the complex conjugate of the second portions.

According to the fifth aspect, the coefficient can be calculated by the simple calculation of multiplying together the first portions and the complex conjugate of the second portions.

As a sixth aspect of the invention, in the reception signal integrating method according to the fourth aspect, the calculating the coefficient may include: multiplying together signal portions at different timings in the assumed period in the first portions and the complex conjugate of signal portions at corresponding same timings in an nth (n is a natural number) second portion; and setting an average of results of the multiplication of the timings obtained concerning the nth second portion as a coefficient of the first portions and the nth second portion.

According to the sixth aspect, the signal portions at the different timings in the assumed period in the first portions and the complex conjugate of the signal portions at the corresponding same timings in the nth second portion are multiplied together. The average of the multiplication results of the timings obtained concerning the nth second portions is set as the coefficient of the first portions and the nth second portions. It is possible to calculate a more accurate coefficient by performing such processing.

As a seventh aspect of the invention, in the reception signal integrating method according to any one of the first to sixth aspects, the integrating the reception signal may include integrating, using the coefficient, the reception signal from which a carrier wave of the satellite signal is not removed.

According to the seventh aspect, the reception signal from which the carrier wave of the satellite signal is not removed is integrated by using the coefficient. Since it is unnecessary to remove the carrier wave of the satellite signal from the reception signal, simplification of a receiving circuit for the satellite signal is realized.

According to an eighth aspect of the invention, there is provided a receiver including: a calculating unit that calculates, in receiving a satellite signal, when a reception signal of the satellite signal is time-divided at an assumed period obtained by estimating code period time of a spread code of the satellite single, a coefficient representing a period shift between a true period and the assumed period of the spread code using first portions and second portions having an assumed period different from that of the first portions in the reception signal; an integrating unit that integrates the reception signal using the coefficient; a correlating unit that performs correlation processing for a signal integrated by the integrating unit; and an acquiring unit that acquires the satellite signal on the basis of a result of the correlation processing.

According to the eight aspect, the coefficient representing the period shift between the true period and the assumed period of the spread code is calculated by the calculating unit. The reception signal is integrated by the integrating unit using the coefficient. The correlation processing for the integrated signal is performed by the correlating unit. The satellite signal is acquired by the acquiring unit on the basis of the result of the correlation processing. With such a configuration, effects same as those in the first embodiment are displayed. Since the correlation processing for the integrated reception signal that takes into account the period shift is performed, it is possible to appropriately calculate a correlation value for acquiring the satellite signal.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
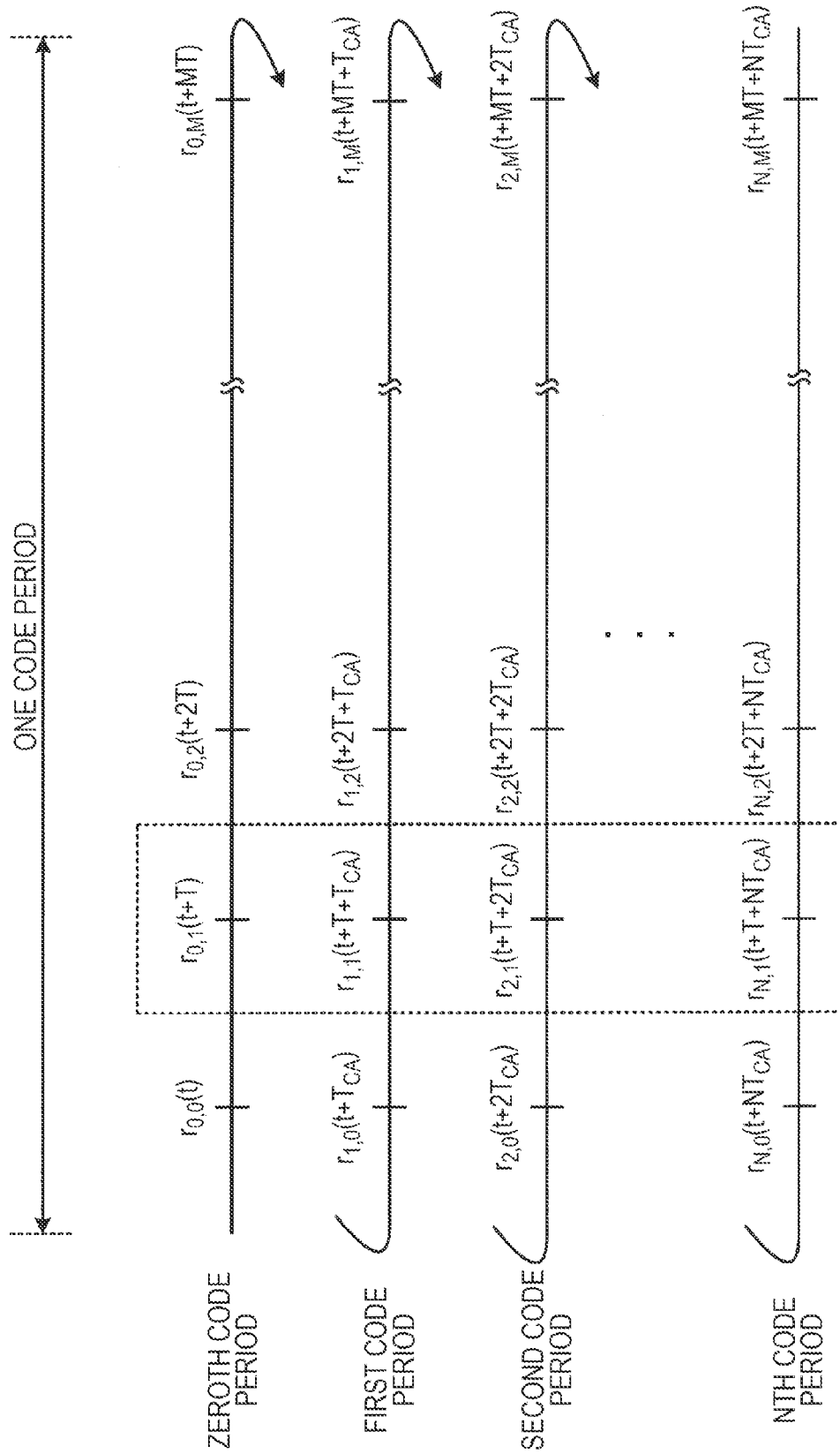
FIG. 1 is an explanatory diagram of a principle of reception signal integration.

Exemplary embodiments of the invention are explained below with reference to the accompanying drawings. In the following explanation, the invention is applied to a GPS receiver that receives and acquires a GPS satellite signal originated from a GPS (Global Positioning System) satellite. It goes without saying that embodiments to which the invention can be applied are not limited to the embodiments explained below.

1. Principle

First, a principle of reception signal integration in an embodiment is explained.

A GPS satellite is a type of a satellite for positioning. Four or more GPS satellites are arranged in each of six earth orbit planes. In principle, the GPS satellites are operated such that the four or more satellites can be always observed anywhere on the earth under the geometrical arrangement.

The GPS satellite originates a navigational message such as almanac or ephemeris while including the navigational message in a GPS satellite signal that is a type of a signal for positioning. The GPS satellite signal is a 1.57542 [GHz] signal modulated by a CDMA (Code Division Multiple Access) system known as a spread spectrum system according to a CA (Coarse and Acquisition) code that is a type of a spread code. The CA code is a pseudo random noise code having a repetition period of 1 ms with a code length 1023 chip set as a 1PN frame and is different for each GPS satellite.

A frequency (a carrier frequency) in origination of the GPS satellite signal by the GPS satellite is specified as 1.57542 [GHz] in advance. However, because of, for example, the influence of Doppler caused by the movement of the GPS satellite or a GPS receiver, a frequency in reception of the GPS satellite signal by the GPS receiver does not always coincide with the carrier frequency. Therefore, the GPS receiver in the past acquires the GPS satellite signal by performing frequency search that is a correlation operation in a frequency direction for acquiring a GPS satellite signal out of a reception signal and phase search that is a correlation operation in a phase direction.

In the frequency search and the phase search, correlation processing for the reception signal and a generated signal of a replica code, which is a replica of a spread code of the GPS satellite signal, is performed to acquire a correlation value and a frequency and a phase in which the correlation value is maximized are detected. In an environment in which the reception signal of the GPS satellite signal is a signal in a strong electric field (e.g., an outdoor environment; hereinafter referred to as "strong electric field environment"), when the correlation processing is applied to the reception signal, a clear difference tends to appear in correlation values. Therefore, it is relatively easy to detect a peak of the correlation values.

However, in an environment in which the reception signal of the GPS satellite signal is a signal in a weak electric field (e.g., an indoor environment; hereinafter referred to as "weak electric field environment"), when the correlation processing is applied to the reception signal, a clear difference does not appear in correlation values. In most cases, it is not easy to detect a peak of the correlation values. Therefore, in the weak electric field environment or the like, a method of integrating the reception signal over a predetermined period and applying the correlation processing to the reception signal integrated over the predetermined period (hereinafter referred to as "integrated reception signal") to acquire correlation values is used.

FIG. 1 is an explanatory diagram of a concept of reception signal integration in the past. A CA code as a spread code of a GPS satellite signal has periodicity. Specifically, the GPS satellite signal is repeatedly transmitted from a GPS satellite with a code length 1023 chip set as a 1PN frame and a repetition period set to 1 ms. Therefore, if the reception signal of the GPS satellite signal is added up at a period time interval of the CA code, an integrated signal with large amplitude (power) should be obtained.

Specifically, sampling data of the reception signal is acquired by sampling the reception signal of the GPS satellite signal at a predetermined time interval. In this embodiment, a sampling unit of the reception signal is referred to as "clock" and elapsed time of one clock is represented by "T". The sampling time interval (i.e., time T) may be a time interval for one chip of the CA code or may be a time interval obtained by more finely fragmenting one chip.

A reception signal "r(t)" at time "t" can be represented as indicated by the following Formula (1).

$$r(t) = I(t) + iQ(t)$$
$$= CA(t) \cdot e^{i\omega t}$$

In Formula (1), "I(t)" and "Q(t)" respectively indicate IQ components of the reception signal "r(t)". Specifically, "I(t)" indicates an in-phase component (a real part) of the reception signal "r(t)" and "Q(t)" indicates an orthogonal component (an imaginary part) of "r(t)". "CA(t)" indicates the CA code of the GPS satellite signal and is a value of one of "+1" and "−1". "exp(iωt)" is a term representing a carrier wave of the GPS satellite signal.

In Formula (1), "ω" is a frequency of the reception signal and is represented by the following Formula (2):

$$\omega = \omega_c + \omega_d \quad (2)$$

where, "$\omega_c$" is a carrier frequency of the GPS satellite signal and "$\omega_d$" is a frequency error (e.g., an error (a clock error) of a Doppler frequency or a local clock).

The reception signal "r(t)" is sampled at every one clock to acquire, for example, M+1 (m=0, 1, 2, ..., and M) sampling data for a period of one CA code. For example, when the sampling is performed for N+1 (n=0, 1, 2, ..., and N) periods, (M+1)×(N+1) sampling data are obtained in total.

What should be noted is that the period of the CA code is a period (an assumed period) obtained by the GPS receiver estimating a period time of the CA code and is different from a true period of the CA code. As explained above, the GPS receiver equivalently determines a period of the CA code by determining a frequency of the GPS satellite signal. However, a frequency in reception of the GPS satellite signal by the GPS receiver does not completely coincide with the carrier frequency because of the influence of Doppler. Therefore, in some case, an apparent period of the CA code diverges from the true period of the CA code.

Further, because of an error (a clock error) of a local clock in the GPS receiver, a period of 1 ms measured on the inside of the GPS receiver is not accurate. In some case, the assumed period and the true period diverge from each other. Therefore, usually, a "period shift" occurs between the true period and the assumed period. As explained above, the period shift is equivalent to a shift between a phase of the carrier wave at the start point of a certain code period and a phase of the carrier wave at the start point of another code period.

In this embodiment, a number "n" of assumed periods obtained by time-dividing the reception signal "r(t)" of the GPS satellite signal by an assumed period "$T_{CA}$" of the CA code is referred to as "code period number" and a number "m"

of sampling of the reception signal at respective code periods is referred to as "sampling number". Both "n" and "m" are natural numbers.

Sampling data of the sampling number "m" in the code period number "n" is represented as "$r_{n,m}(t)$". Specifically, the code period number and the sampling number are represented by subscripts in this order and time corresponding to the sampling is represented by parentheses. A CA code corresponding to the sampling is represented as "$CA_{n,m}(t)$".

In FIG. 1, concerning a zeroth code period (n=0), "M+1" sampling data $\{r_{0,0}(t), r_{0,1}(t+T), r_{0,2}(t+2T), \ldots,$ and $r_{0,M}(t+MT)\}$ are obtained. Similarly, concerning a first code period (n=1), sampling data $\{r_{1,0}(t+T_{CA}), r_{1,1}(t+T+T_{CA}), r_{1,2}(t+2T+T_{CA}), \ldots,$ and $r_{1,M}(t+MT+T_{CA})\}$ are obtained. Concerning an Nth code period (n=N), sampling data $\{r_{N,0}(t+NT_{CA}), r_{N,1}(t+T+NT_{CA}), r_{N,2}(t+2T+NT_{CA}), \ldots,$ and $r_{N,M}(t+MT+NT_{CA})\}$ are obtained. In other words, concerning the code periods "n", "M+1" sampling data are obtained.

Subsequently, concerning each of the sampling numbers "m", the sampling data of the respective code periods (n=0 to N) are added up to acquire integrated sampling data "$R_m$". Specifically, integrated sampling data "$R_m(t)$" is calculated according to the following Formula (3):

$$R_m(t) = \sum_{n=0}^{N} r_{n,m}(t + nT_{CA}) \quad (3)$$

$$= \sum_{n=0}^{N} CA_{n,m}(t + nT_{CA}) \cdot e^{i\omega(t+nT_{CA})}$$

$$= CA_{n,m}(t) \cdot e^{i\omega t} \cdot \sum_{n=0}^{N} e^{i\omega nT_{CA}}$$

where, a characteristic "$CA_{n,m}(t)=CA_{n,m}(t+nT_{CA})$" obtained from the periodicity of the CA code is utilized.

For example, attention is paid to the sampling number "m=1". As shown in FIG. 1, the sampling data "$r_{0,1}(t+T)$" at the zeroth code period, the sampling data $r_{1,1}(t+T+T_{CA})$ at the first code period, the sampling data "$r_{2,1}(t+T+2T_{CA})$" at the second code period, . . . , and the sampling data "$r_{N,1}(t+T+NT_{CA})$" at the Nth code period are added up to calculate integrated sampling data "$R_1(t+T)$".

In Formula (3), a term represented by "$\Sigma \exp(i\omega nT_{CA})$" is included in the integrated sampling data "$R_m(t)$". An absolute value of this term is a term that is "N+1" at the maximum and "0" at the minimum as indicated by the following Formula (4).

$$0 \leq \left| \sum_{n=0}^{N} e^{i\omega nT_{CA}} \right| \leq N+1 \quad (4)$$

Therefore, if a value of the term represented by "$\Sigma \exp(i\omega nT_{CA})$" is smaller than "1", the integrated sampling data "$R_m(t)$" has a small value compared with the original sampling data "$r_{n,m}(t)$".

The meaning of the above is examined. "$\exp(i\omega nT_{CA})$" in Formula (4) is considered to represent a shift between a phase of the carrier wave at the start point of the zeroth code period and a phase of the carrier wave at the start point of the nth code period, i.e., a period shift at the nth code period. Therefore, this means that, depending on the magnitude of the period shift at the respective code periods, when the reception signal is integrated, the amplitude (power) of an integrated signal is small.

As it is seen from the formulas, a cause of such a problem is the presence of the carrier wave "$\exp(i\omega t)$". In other words, when the reception signal is integrated while the carrier wave "$\exp(i\omega t)$" is not removed from the reception signal "$r(t)$", signals do not strengthen each other but weaken each other on the contrary.

To solve this problem, the inventor devised a new integration method for a reception signal for calculating a coefficient called "period shift coefficient" as an index representing a period shift in code periods and integrating the reception signal using this period shift coefficient.

Figure 2:
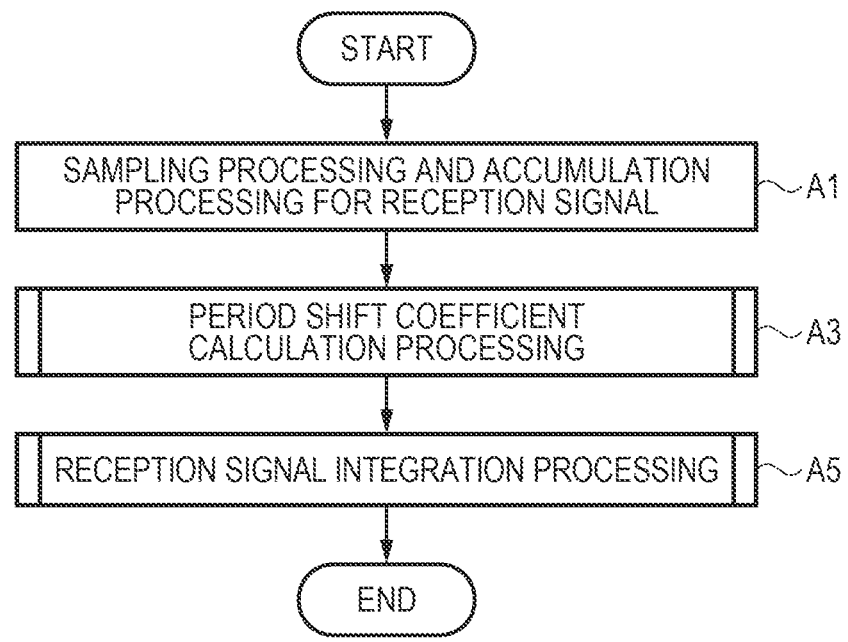
FIG. 2 is a flowchart for explaining a flow of reception signal integration processing.

FIG. 2 is a flowchart for explaining reception signal integration processing in this embodiment.

First, sampling processing and accumulation processing for a reception signal are performed (step A1). Specifically, the reception signal is sampled at a predetermined sampling time interval (timing at every one clock) and sampling data "$r_{n,m}(t)$" of the sampling is accumulated in a storing unit.

Subsequently, period shift coefficient calculation processing is performed (step A3). In the period shift coefficient calculation processing, concerning each of code periods (n=0 to N), a period shift coefficient representing a period shift is calculated by using reception signal portions at different code periods. Specifically, for example, when the zeroth code period (n=0) is set as a reference code period, a period shift coefficient "$S_n$" of the other code periods (n=1 to N) is calculated according to the following Formula (5):

$$S_n = \frac{1}{M+1} \sum_{m=0}^{M} r_{0,m}(t) \cdot \{r_{n,m}(t+nT_{CA})\}^* \quad (5)$$

$$= \frac{1}{M+1} \sum_{m=0}^{M} CA_{0,m}(t) \cdot e^{i\omega t} \cdot CA_{n,m}(t+nT_{CA}) \cdot$$

$$e^{-i\omega t} \cdot e^{-i\omega nT_{CA}}$$

$$= \frac{1}{M+1} \cdot \sum_{m=0}^{M} e^{-i\omega nT_{CA}}$$

$$= \frac{1}{M+1} \cdot e^{-i\omega nT_{CA}} \cdot \sum_{m=0}^{M} 1$$

$$= \frac{1}{M+1} \cdot e^{-i\omega nT_{CA}} \cdot (M+1)$$

$$= e^{-i\omega nT_{CA}}$$

where, a characteristic "$CA_{0,m}(t) \times CA_{n,m}(t+nT_{CA})=1$" is utilized. The superscript "*" indicates complex conjugate.

Figure 3:
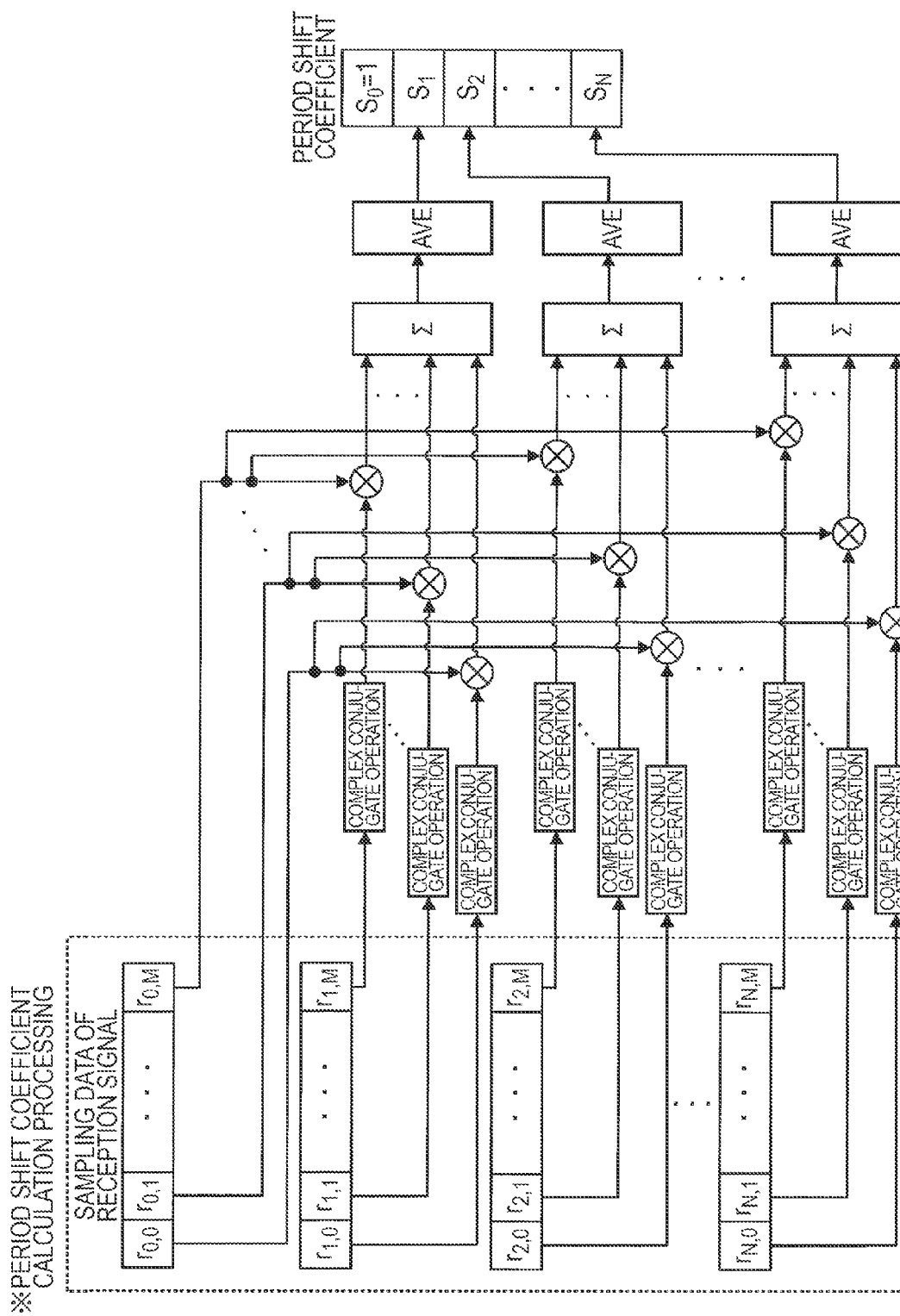
FIG. 3 is an explanatory diagram of a principle of period shift coefficient calculation.

FIG. 3 is an explanatory diagram of a principle of period shift coefficient calculation. A period shift coefficient is calculated by using sampling data (first reception signal portions) at the reference code period (the zeroth code period) and sampling data (second reception signal portions) at the other code periods (the nth code period). Specifically, as shown in FIG. 3, signal portions at different timings at the zeroth code period, i.e., sampling data "$r_{0,m}$" of the sampling numbers "m" (m=0 to M) and the complex conjugate "$\{r_{n,m}\}^*$" of signal portions at corresponding same timings in the nth code period, i.e., sampling data of the corresponding sampling numbers "m" (m=0 to M) are multiplied together with the sampling numbers "m" set in order.

An average of multiplication results "$r_{0,m} \cdot \{r_{n,m}\}^*$" obtained concerning the respective M+1 sampling data is set as a period shift coefficient "$S_n$" of the reference code period (the zeroth code period) and the nth code period. Specifically, a period shift coefficient is calculated concerning each of the code periods by using sampling data at same timings in the code periods among sets of sampling data as reception signal portions at the code periods in the reception signal.

Referring back to the reception signal integration processing shown in FIG. 2, after the period shift coefficient calculation processing is performed, reception signal integration processing is performed (step A5). In the reception signal integration processing, integrated sampling data "$R_m$" is calculated according to the following Formula (6) by using the sampling data "$r_{n,m}$" of the reception signal and the period shift coefficient "$S_n$" calculated in the period shift coefficient calculation processing:

$$\begin{aligned} R_m(t) &= \sum_{n=0}^{N} r_{n,m}(t + nT_{CA}) \cdot S_n \\ &= \sum_{n=0}^{N} CA_{n,m}(t + nT_{CA}) \cdot e^{i\omega(t+nT_{CA})} \cdot e^{-i\omega nT_{CA}} \\ &= CA_{n,m}(t) \cdot e^{i\omega t} \cdot \sum_{n=0}^{N} 1 \\ &= CA_{n,m}(t) \cdot e^{i\omega t} \cdot (N+1) \end{aligned} \quad (6)$$

where, a characteristic "$CA_{n,m}(t+nT_{CA})=CA_{n,m}(t)$" is utilized.

Figure 4:
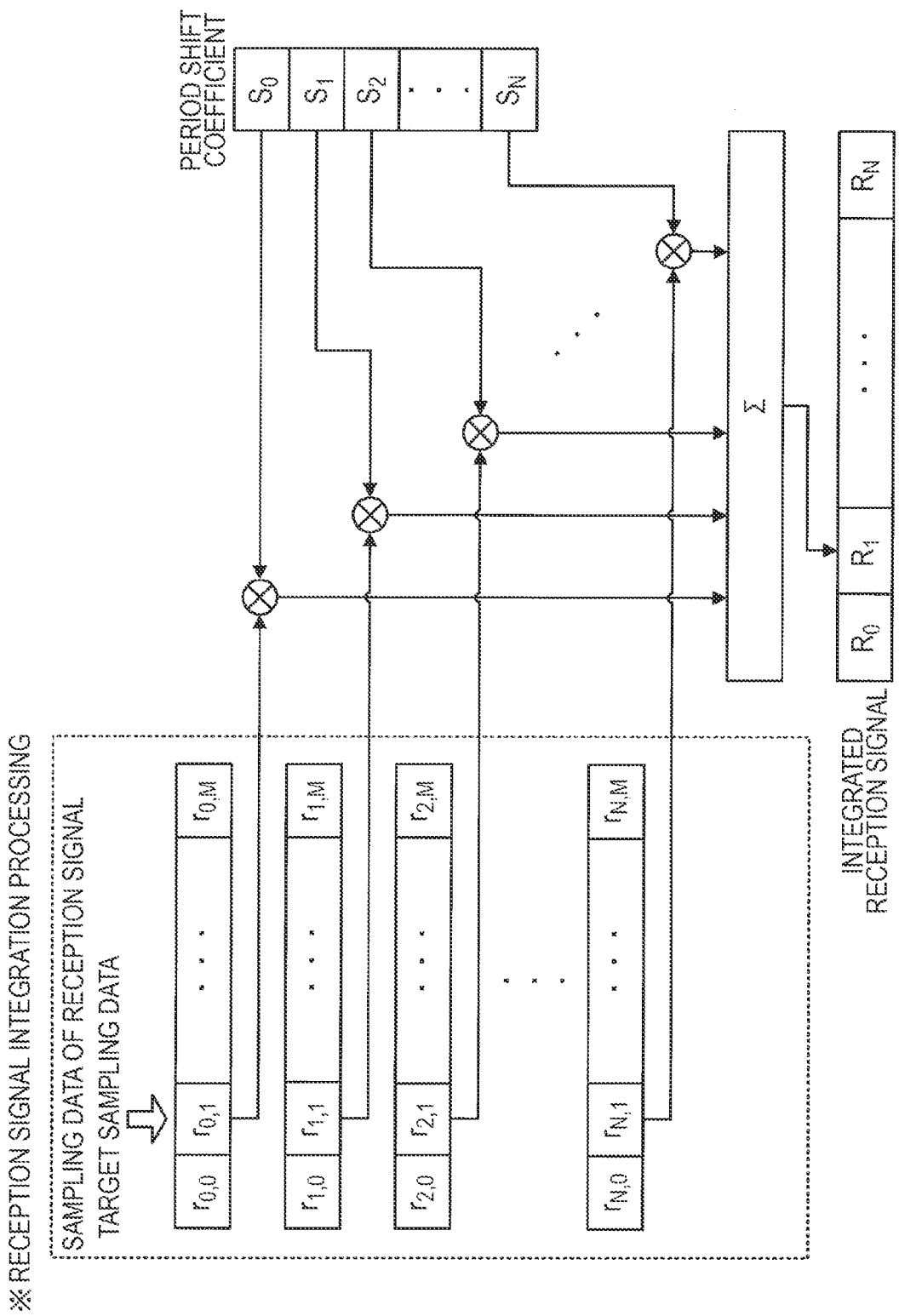
FIG. 4 is an explanatory diagram of reception signal integration.

FIG. 4 is an explanatory diagram of a principle of reception signal integration. The integrated sampling data "$R_m$" is calculated by multiply-accumulating the sampling data "$r_{n,m}$" at each of the code periods and the period shift coefficient "$S_n$" at the corresponding code period. Specifically, as shown in FIG. 4, concerning each of the sampling numbers "m" (m=0 to M), the sampling data "$r_{n,m}$" at the nth code period and the period shift coefficient "$S_n$" at the nth code period are multiplied together to calculate a multiplied value "$r_{n,m} \cdot S_n$". The integrated sampling data "$R_m$" is calculated concerning each of the sampling numbers "m" by adding up multiplied values "$r_{n,m} \cdot S_n$" obtained concerning the respective N+1 code periods. Finally, a set of the integrated sampling data "$R_m$" for one period obtained concerning each of the sampling numbers "m" is a reception signal subjected to the reception signal integration processing (hereinafter referred to as "integrated reception signal").

As it is seen from Formula (5), the period shift coefficient "$S_n$" is calculated by multiplying together the sampling data "$r_{0,m}(t)$" at the zeroth code period and the complex conjugate (a complex number with a sign of an imaginary part inverted) "$\{r_{n,m}(t+nT)\}^*$" of the sampling data at the nth code period and is represented as "$S_n=\exp(-i\omega nT_{CA})$". It is seen from this that the period shift coefficient "$S_n$" is the complex conjugate of the portion of "$\exp(i\omega nT_{CA})$" that is the problem in Formulas (3) and (4). Therefore, it is possible to erase the portion of "$\exp(i\omega nT_{CA})$" by multiplying the sampling data "$r_{n,m}$" with the period shift coefficient "$S_n$".

After the portion of "$\exp(i\omega nT_{CA})$" is erased concerning the code periods "n" in this way, the multiplied values "$r_{n,m} \cdot S_n$" obtained concerning the code periods n are added up. This makes it possible to obtain an integrated reception signal not including the term of "$\Sigma\exp(i\omega nT_{CA})$".

When Formula (3) and Formula (6) are compared, the term of "$\Sigma\exp(i\omega nT_{CA})$" in the formula of the integrated sampling data "$R_m$" is replaced with "N+1" that is a total number of code periods. "N+1" is a constant and a value of "N+1" does not change. Therefore, the integrated sampling data "$R_m$" calculated according to Formula (6) is a strong signal with an increased gain.

Consequently, by integrating the reception signal "r(t)" using the period shift coefficient "S", it is possible to obtain a high-quality integrated reception signal with an increased gain without removing the carrier wave "$\exp(i\omega t)$" from the reception signal of the GPS satellite signal.

"$\omega_d$" in Formula (2) represents the frequency error due to a Doppler frequency and an error (a clock error) of the local clock in the GPS receiver. However, other frequency errors can be further included to consider the frequency errors. Irrespective of what kind of value "$\omega_d$" is, it is possible to obtain a signal suitable for the correlation processing according to the reception signal integrating method explained above.

2. Example

An example of the GPS receiver to which the principle explained above is applied is explained below. A cellular phone 1 as a type of an electronic apparatus mounted with the GPS receiver is explained as a specific example.

2-1. Configuration

Figure 5:
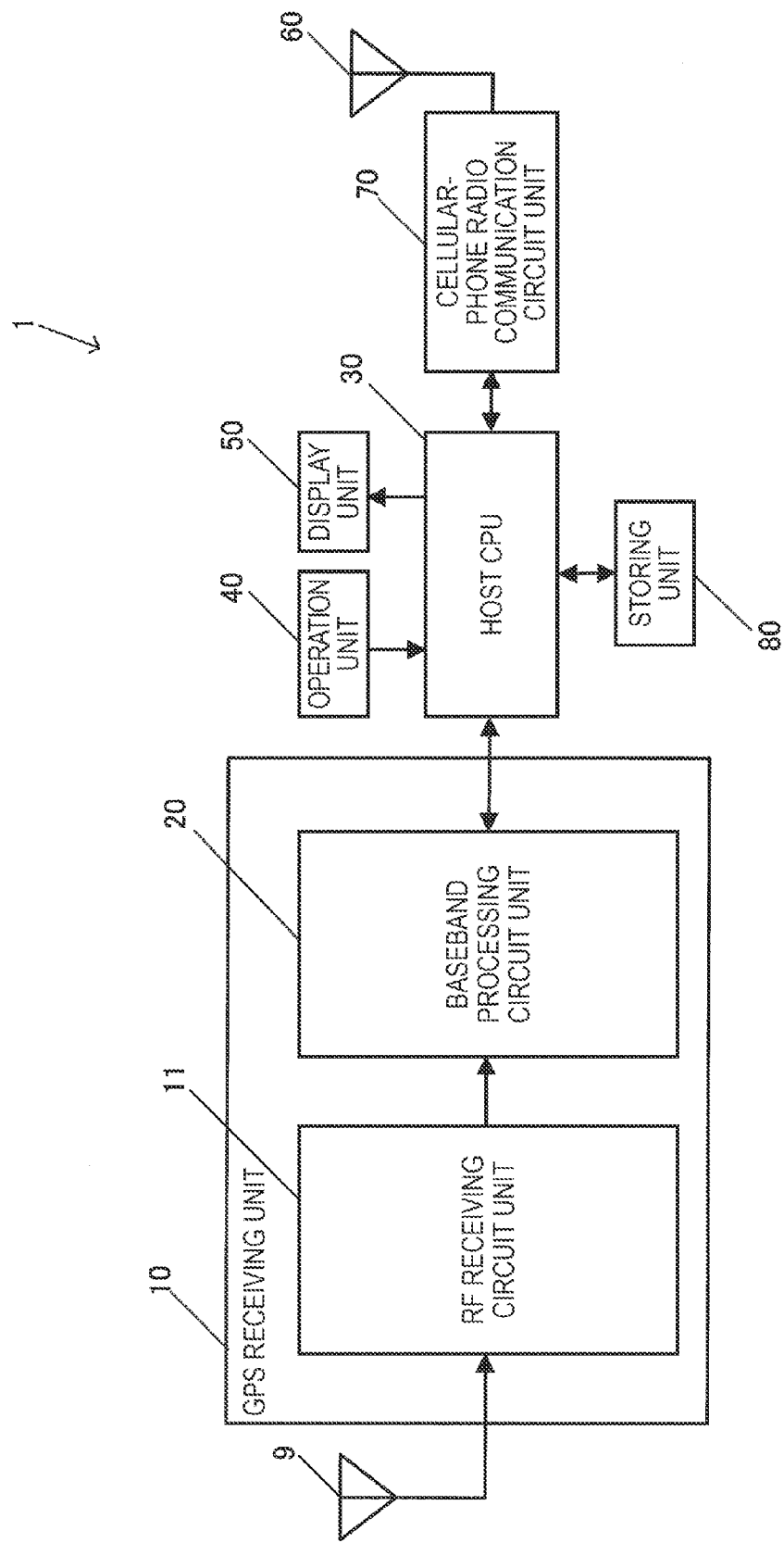
FIG. 5 is a block diagram showing a functional configuration of a cellular phone.

FIG. 5 is a block diagram showing a functional configuration of the cellular phone 1. The cellular phone 1 includes a GPS antenna 9, a GPS receiving unit 10, a host CPU (Central Processing Unit) 30, an operation unit 40, a display unit 50, a cellular phone antenna 60, a cellular-phone radio communication circuit unit 70, and a storing unit 80.

The GPS antenna 9 is an antenna that receives an RF (Radio Frequency) signal including a GPS satellite signal originated from a GPS satellite. The GPS antenna 9 outputs a reception signal to the GPS receiving unit 10.

The GPS receiving unit 10 is a location calculating circuit that measures the location of the cellular phone 1 on the basis of the signal output from the GPS antenna 9 and is a functional block equivalent to a so-called GPS receiver. The GPS receiving unit 10 includes an RF (Radio Frequency) receiving circuit unit 11 and a baseband processing circuit unit 20. The RF receiving circuit unit 11 and the baseband processing circuit unit 20 can be manufactured as separate LSIs (Large Scale Integrations) or can be manufactured as one chip.

The RF receiving circuit unit 11 is a processing circuit block for an RF signal. The RF receiving circuit unit 11 generates an oscillation signal for RF signal multiplication by dividing or multiplying a predetermined oscillation signal. The RF receiving circuit unit 11 down-converts the RF signal into a signal of an intermediate frequency (hereinafter referred to as "IF (Intermediate Frequency) signal") by multiplying the RF signal output from the GPS antenna 9 with the generated oscillation signal and, after, for example, amplifying the IF signal, converts the IF signal into a digital signal with an A/D converter and outputs the digital signal to the baseband processing circuit unit 20.

The baseband processing circuit unit 20 is a circuit unit that applies correlation operation processing or the like to the IF signal output from the RF receiving circuit unit 11 to acquire and extract a GPS satellite signal, decodes data, and extracts a navigational message, time information, and the like.

Figure 6:
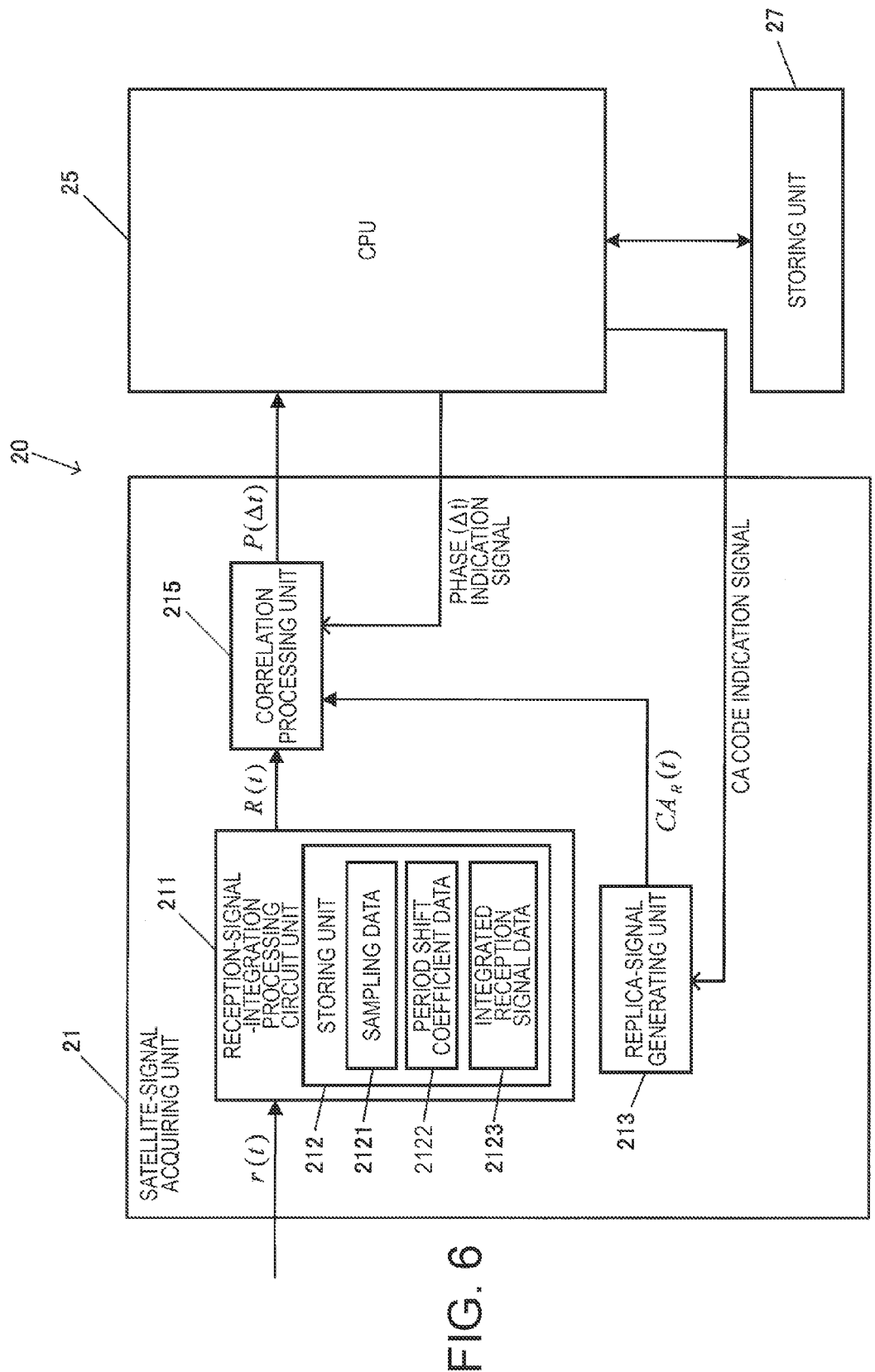
FIG. 6 is a diagram showing an example of a circuit configuration of a baseband processing circuit unit.

FIG. 6 is a diagram showing an example of a circuit configuration of the baseband processing circuit unit 20. The baseband processing circuit unit 20 includes a satellite-signal acquiring unit 21, a CPU 25, and a storing unit 27.

The satellite-signal acquiring unit 21 is a circuit unit that acquires a GPS satellite signal from a reception signal that is the IF signal output from the RF receiving circuit unit 11. The satellite-signal acquiring unit 21 includes a reception-signal-integration processing circuit unit 211, a replica-signal generating unit 213, and a correlation processing unit 215.

The reception-signal-integration processing circuit unit 211 is a circuit unit that performs processing for integrating the reception signal "r(t)" that is the IF signal output from the RF receiving circuit unit 11. The reception-signal-integration processing circuit unit 211 outputs the integrated reception signal "R(t)" to the correlation processing unit 215. In this embodiment, the reception-signal-integration processing circuit unit 211 includes a processor such as a digital signal processor (DSP) and a memory. The reception-signal-integration processing circuit unit 211 is explained as executing the reception signal integration processing as digital signal processing according to the flowchart explained with reference to FIG. 2.

The reception-signal-integration processing circuit unit 211 includes a storing unit 212 as a memory that stores various kinds of data. The storing unit 212 stores, for example, sampling data 2121 of a reception signal obtained by sampling the reception signal, period shift coefficient data 2122 as data of a period shift coefficient calculated concerning code periods, and integrated reception signal data 2123 as data of the integrated reception signal.

The reception-signal-integration processing circuit unit 211 functions as a coefficient calculating unit that calculates a period shift coefficient using the sampling data 2121 of the reception signal and functions as a reception-signal integrating unit that integrates the sampling data 2121 of the reception signal using the period shift coefficient.

In the GPS receiver in the past, it is necessary to integrate the reception signal "r(t)" after removing the carrier wave "exp(iωt)" from the reception signal "r(t)". Therefore, for example, it is necessary to provide a detecting unit (a carrier reproducing unit) for removing a carrier wave in the reception-signal-integration processing circuit unit 211. However, in this embodiment, since the reception signal is integrated by using the period shift coefficient as explained concerning the principle, it is unnecessary to provide the detecting unit in the reception-signal-integration processing circuit unit 211.

The replica-signal generating unit 213 is a circuit unit that generates a replica signal that is a generated signal of a spread code replica of a CA code of a GPS satellite signal. The replica-signal generating unit 213 generates a replica signal "$CA_R(t)$" conforming to a CA code indication signal (an indication signal of an acquisition target satellite) output from the CPU 25 and outputs the replica signal "$CA_R(t)$" to the correlation processing unit 215.

The correlation processing unit 215 is a circuit unit that performs correlation processing for the integrated reception signal "R(t)" input from the reception-signal-integration processing circuit unit 211 and the replica signal "$CA_R(t)$" input from the replica-signal generating unit 213. The correlation processing unit 215 calculates, according to a phase indication signal input from the CPU 25, correlation between "R(t)" and "$CA_R(t+\Delta t)$" while changing a phase "Δt" of the replica signal and outputs a correlation value "P(Δt)" of the correlation to the CPU 25.

The CPU 25 is a processor that collectively controls units of the baseband processing circuit unit 20 according to various computer programs such as a system program stored in the storing unit 27. The CPU 25 performs, concerning each acquisition target satellite, processing for detecting a code phase on the basis of the correlation value "P(Δt)" output from the correlation processing unit 215. The CPU 25 calculates a pseudo distance between the acquisition target satellite and the cellular phone 1 using the calculated code phase, performs location calculation using the calculated pseudo distance, and calculates the location of the cellular phone 1.

The CPU 25 outputs a CA code indication signal for indicating a CA code of the acquisition target satellite (a PRN number of the acquisition target satellite) to the replica-signal generating unit 213 and causes the replica-signal generating unit 213 to generate a replica signal "$CA_R(t)$" of the acquisition target satellite. The CPU 25 outputs a phase indication signal for indicating a phase "Δt" of the replica signal "$CA_R(t)$" to the correlation processing unit 215 and causes the correlation processing unit 215 to execute the correlation processing while changing the phase "Δt" of the replica signal "$CA_R(t)$".

The storing unit 27 includes a storage device such as a ROM (Read Only Memory), a flash ROM, or a RAM (Random Access Memory). The storing unit 27 has stored therein, for example, a system program for the CPU 25 to control the baseband processing circuit unit 20 and various computer programs and data for realizing a location calculating function. The storing unit 27 forms a work area for temporarily storing the system program executed by the CPU 25, the various processing programs, data being subjected to various kinds of processing, a processing result, and the like.

The host CPU 30 is a processor that collectively controls the units of the cellular phones 1 according to the various computer programs such as the system program stored in the storing unit 80. The host CPU 30 performs processing for causing the display unit 50 to display location information input from the baseband processing circuit unit 20 and performs various kinds of application processing using the location information.

The operation unit 40 is an input device including, for example, a touch panel and button switches. The operation unit 40 outputs a signal of a depressed key or button to the host CPU 30. According to the operation of the operation unit 40, various instruction inputs such as a call request, a mail transmission and reception request, and a location calculation request are performed.

The display unit 50 is a display device that includes an LCD (Liquid Crystal Display) and performs various kinds of display based on display signals input from the host CPU 30. A location display screen, time information, and the like are displayed on the display unit 50.

The cellular phone antenna 60 is an antenna that performs transmission and reception of a cellular phone radio signal between the cellular phone 1 and a radio base station set by a communication service provider.

The cellular-phone radio communication circuit unit 70 is a cellular-phone communication circuit unit including an RF converting circuit and a baseband processing circuit. The cellular-phone radio communication circuit unit 70 realizes, for example, transmission and reception of calls and emails by performing modulation and demodulation and the like of a cellular phone radio signal.

The storing unit 80 is a storage device that stores, for example, a system program for the host CPU 30 to control the cellular phone 1 and various computer programs and data for realizing a location calculating function.

2-2. Flow of Processing (1) Processing by the Reception-Signal-Integration Processing Circuit Unit 211

Figure 7:
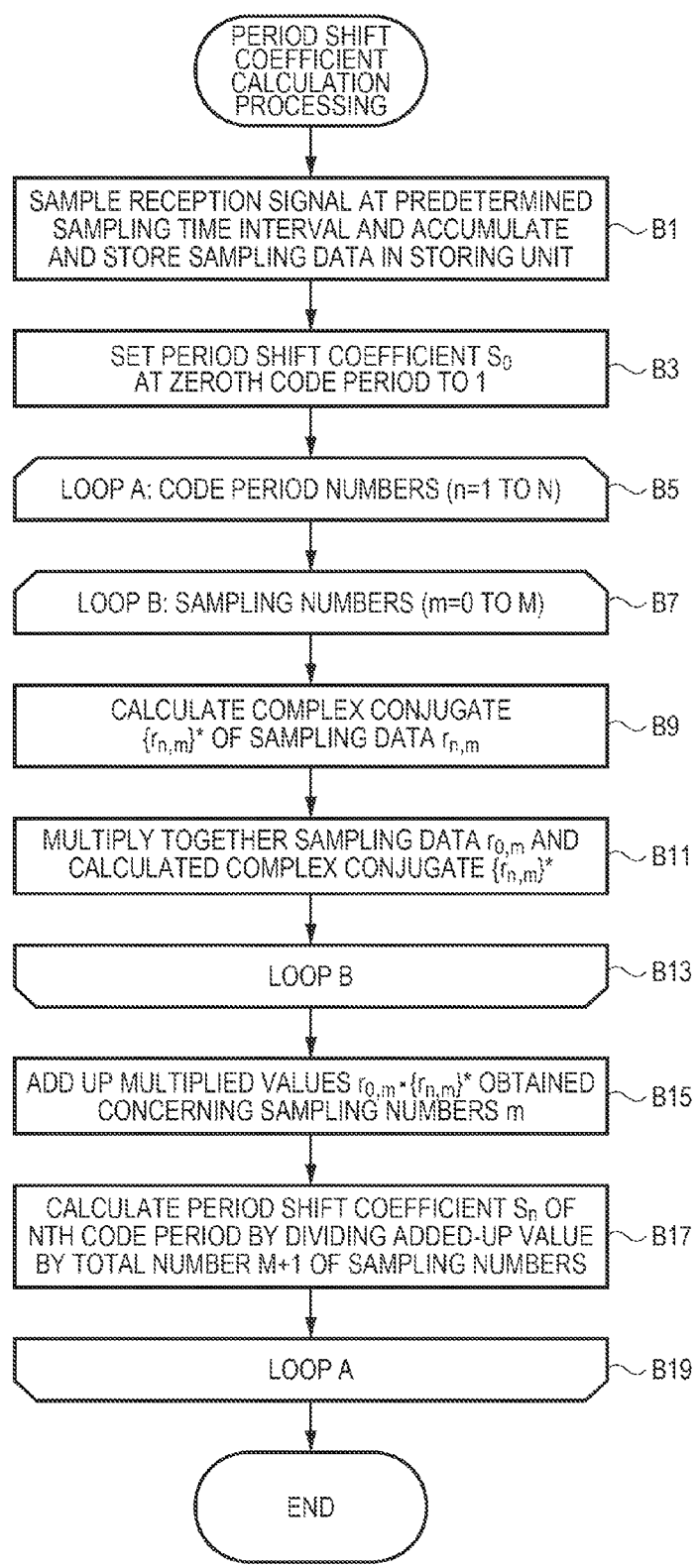
FIG. 7 is a flowchart for explaining a flow of period shift coefficient calculation processing.

FIG. 7 is a flowchart for explaining a flow of the period shift coefficient calculation processing executed by the reception-signal-integration processing circuit unit 211 in step A3 of the reception signal integration processing shown in FIG. 2. Although not specifically explained, during the execution of the reception signal integration processing, reception of an RF signal by the GPS antenna 9 and down-conversion of the RF signal into an IF signal by the RF receiving circuit unit 11 are performed. The reception signal "r(t)" converted into the IF signal is output to the baseband processing circuit unit 20 at any time.

First, the reception-signal-integration processing circuit unit 211 samples, at a predetermined sampling time interval, the reception signal "r(t)" output from the RF receiving circuit unit 11 to acquire the sampling data "$r_{n,m}$" of the reception signal and causes the storing unit 212 to store the sampling data "$r_{n,m}$" as the sampling data 2121 (step B1).

Subsequently, the reception-signal-integration processing circuit unit 211 sets a period shift coefficient "$S_0$" at the zeroth code period (n=0), which is the reference code period, to "1" and causes the storing unit 212 to store the coefficient "$S_0$" in the coefficient data 2122 (step B3).

Thereafter, the reception-signal-integration processing circuit unit 211 executes processing of a loop A concerning each of the other code period numbers (n=1 to N) excluding the reference code period (steps B5 to B19). In the processing of the loop A, the reception-signal-integration processing circuit unit 211 executes processing of a loop B concerning each of the sampling numbers "m" (m=0 to M) (steps B7 to B13).

In the processing of the loop B, the reception-signal-integration processing circuit unit 211 calculates the complex conjugate "$\{r_{n,m}\}^*$" of the sampling data "$r_{n,m}$" (step B9). The reception-signal-integration processing circuit unit 211 multiplies together the sampling data "$r_{0,m}$" at the reference code period and the calculated complex conjugate "$\{r_{n,m}\}^*$" (step B11). The reception-signal-integration processing circuit unit 211 shifts the processing to the next sampling number.

After performing the processing in steps B9 and B11 concerning all the sampling numbers "m", the reception-signal-integration processing circuit unit 211 ends the processing of the loop B (step B13). The reception-signal-integration processing circuit unit 211 adds up multiplied values "$r_{0,m} \cdot \{r_{n,m}\}^*$" obtained concerning the respective sampling numbers "m" (step B15).

The reception-signal-integration processing circuit unit 211 calculates the period shift coefficient "$S_n$" of the nth code period by dividing an added-up value by the total number M+1 of the sampling numbers and causes the storing unit 212 to store the coefficient "$S_n$" in the period shift coefficient data 2122 (step B17). The reception-signal-integration processing circuit unit 211 shifts the processing to the next code period number.

When the reception-signal-integration processing circuit unit 211 performs the processing in steps B7 to B17 concerning all the code period numbers "n" to calculate the period shift coefficient "$S_n$", the reception-signal-integration processing circuit unit 211 ends the processing of the loop A (step B19) and ends the period shift coefficient calculation processing.

Figure 8:
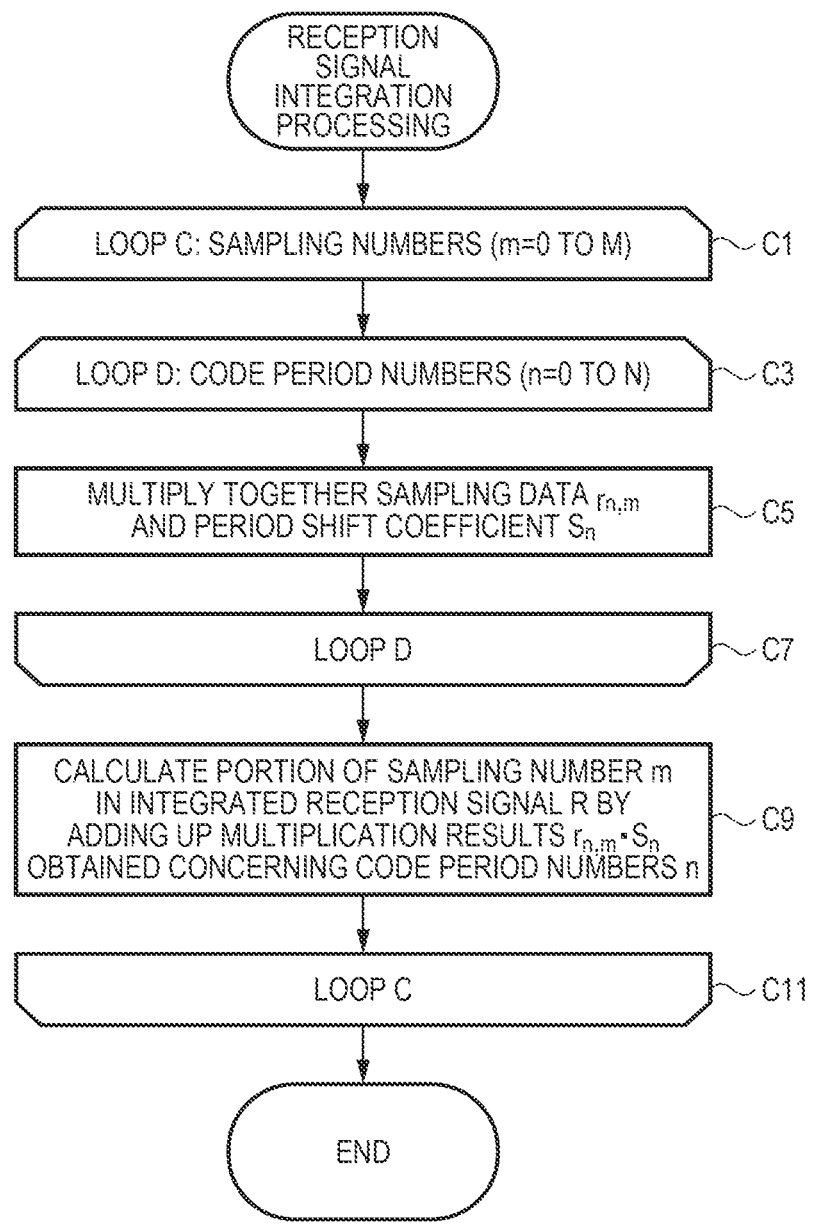
FIG. 8 is a flowchart for explaining a flow of reception signal integration processing.

FIG. 8 is a flowchart for explaining a flow of the reception signal integration processing executed by the reception-signal-integration processing circuit unit 211 in step A5 of the reception signal integration processing shown in FIG. 2.

First, the reception-signal-integration processing circuit unit 211 executes processing of a loop C concerning each of the sampling numbers (m=0 to M) (steps C1 to C11). In the processing of the loop C, the reception-signal-integration processing circuit unit 211 executes processing of a loop D concerning each of the code period numbers (n=0 to N) (steps C3 to C7).

In the processing of the loop D, the reception-signal-integration processing circuit unit 211 multiplies together the sampling data "$r_{n,m}$" and the period shift coefficient "$S_n$" (step C5). The reception-signal-integration processing circuit unit 211 shifts the processing to the next code period number.

After performing the processing in step C5 concerning all the code period numbers "n", the reception-signal-integration processing circuit unit 211 ends the processing of the loop D (step C7). Thereafter, the reception-signal-integration processing circuit unit 211 calculates the portion of the sampling number "m" in the integrated reception signal "R" by adding up the multiplication results "$r_{n,m} \cdot S_n$" obtained concerning the respective code period numbers "n" and causes the storing unit 212 to store the portion in the integrated reception signal data 2123 (step C9). The reception-signal-integration processing circuit unit 211 shifts the processing to the next sampling number.

After calculating the integrated reception signal "R(t)" by performing the processing in steps C3 to C9 concerning all the sampling numbers "m", the reception-signal-integration processing circuit unit 211 ends the processing of the loop C (step C11) and ends the reception signal integration processing.

(2) Processing by the CPU 25

Figure 9:
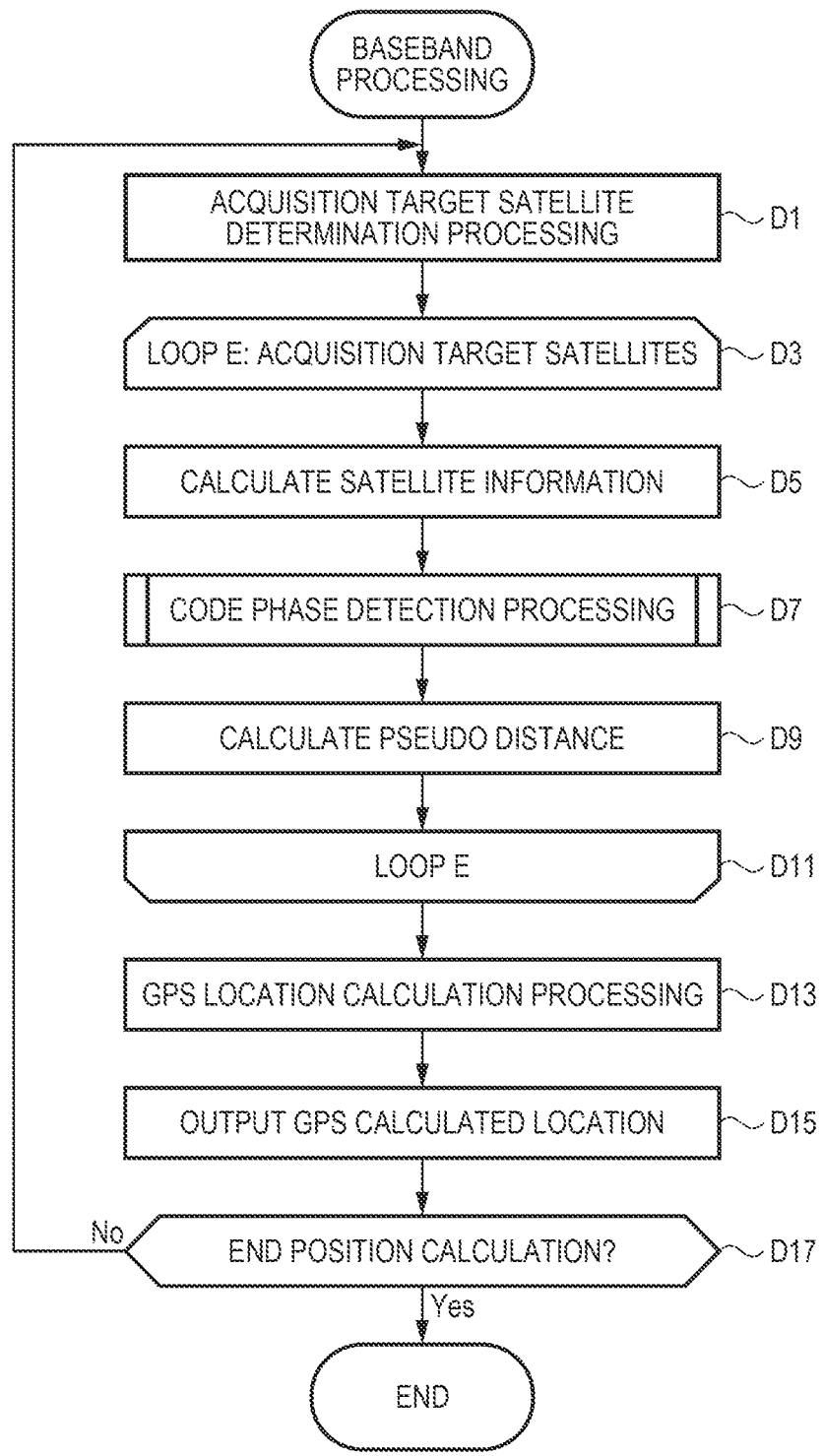
FIG. 9 is a flowchart for explaining a flow of baseband processing.

FIG. 9 is a flowchart for explaining a flow of baseband processing executed by the CPU 25 of the baseband processing circuit unit 20.

First, the CPU 25 performs acquisition-target-satellite determination processing (step D1). Specifically, the CPU 25 determines, using satellite orbit data such as almanac or ephemeris, a GPS satellite located in the sky in a predetermined reference location at the present time measured by a not-shown timing unit and sets the GPS satellite as an acquisition target satellite. The reference location can be set by a method of, for example, in the case of first location calculation after power-on, setting the reference location in a location acquired from a base station of the cellular phone 1 by so-called server assist and, in the case of second and subsequent location calculation, setting the reference location in a latest GPS calculation location obtained by the last location calculation.

Subsequently, the CPU 25 executes processing of a loop E concerning each of the acquisition target satellites determined in step D1 (steps D3 to D11). In the processing of the loop E, the CPU 25 calculates, on the basis of a navigational message included in a GPS satellite signal of the acquisition target satellite, satellite information such as a satellite location, satellite moving speed, and a satellite moving direction of the acquisition target satellite (step D5). The CPU 25 performs code phase detection processing (step D7).

Figure 10:
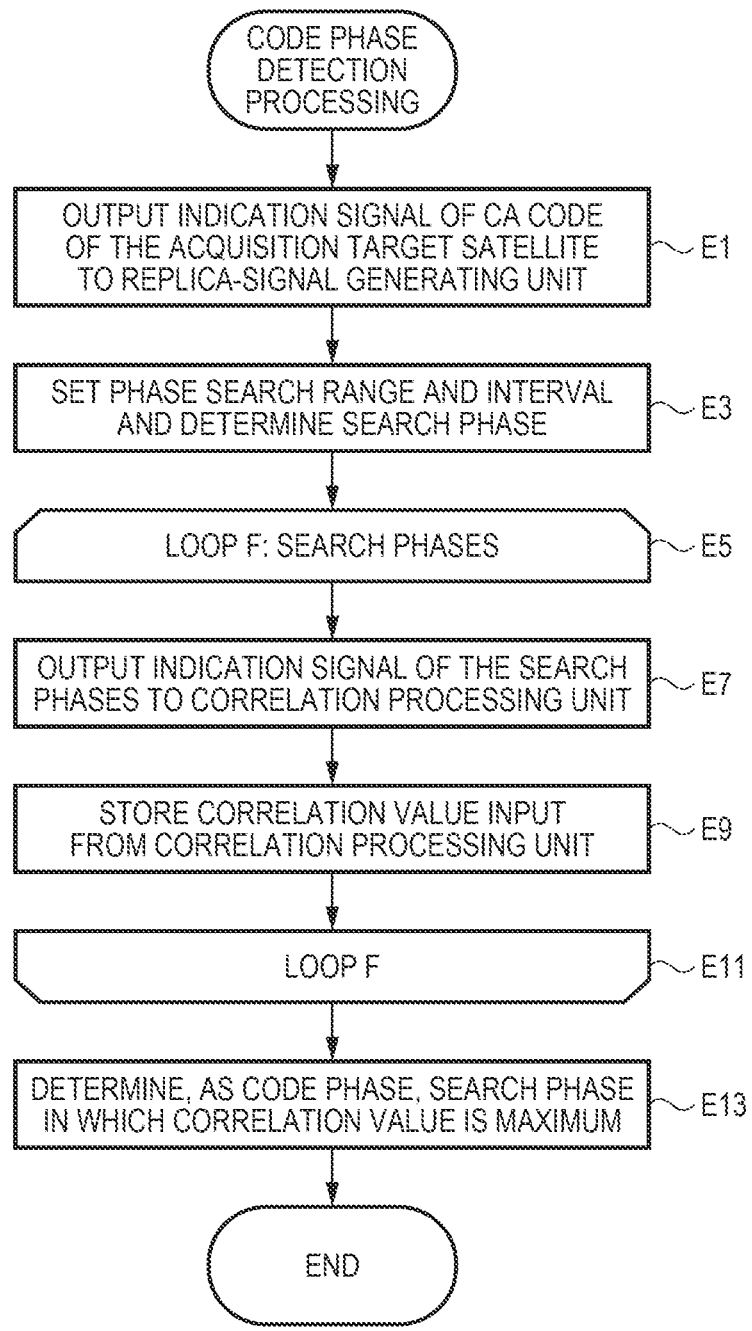
FIG. 10 is a flowchart for explaining a flow of code phase detection processing.

FIG. 10 is a flowchart for explaining a flow of code phase detection processing.

First, the CPU 25 outputs an indication signal of a CA code of the acquisition target satellite to the replica-signal generating unit 213 (step E1). The CPU 25 sets a phase search range and a phase search interval and determines search phases used for phase search (step E3).

Subsequently, the CPU 25 executes processing of a loop F concerning each of the search phases set in step E3 (steps E5 to E11). In the processing of the loop F, the CPU 25 outputs an indication signal for the search phase "Δt" to the correlation processing unit 215 (step E7).

When step E7 is executed, as explained above, the correlation processing unit 215 performs the correlation processing for the integrated reception signal "R(t)" calculated by the reception-signal-integration processing circuit unit 211 on the basis of the principle explained with reference to FIGS. 1 to 4 and the replica signal "$CA_R(t)$" input from the replica-signal generating unit 213. The correlation processing unit 215 calculates, according to a phase indication signal input from the CPU 25, correlation between "$R(t)$" and "$CA_R(t+\Delta t)$" while changing the phase "$\Delta t$" of the replica signal and outputs the correlation value "$P(\Delta t)$" of the correlation to the CPU 25.

When the correlation value "$P(\Delta t)$" is input from the correlation processing unit 215, the CPU 25 causes the storing unit 27 to store the correlation value "$P(\Delta t)$" (step E9). The CPU 25 shifts the processing to the next search phase.

After performing the processing in steps E7 and E9 concerning all search phases, the CPU 25 ends the processing of the loop F (step E11). The CPU 25 determines, as a code phase, the search phase "$\Delta t$" in which the correlation value "$P(\Delta t)$" stored in the storing unit 27 is the maximum (step E13). The CPU 25 ends the code phase detection processing.

Referring back to the baseband processing shown in FIG. 9, after ending the code phase detection processing, the CPU 25 calculates a pseudo distance between the acquisition target satellite and the cellular phone 1 using the satellite information calculated in step D5 and the code phase detected in step D7 (step D9). An integer portion of the pseudo distance can be calculated by using, for example, a latest GPS calculation location and a satellite location. A fraction portion of the pseudo distance can be calculated by using the code phase. After calculating the pseudo distance, the CPU 25 shifts the processing to the next acquisition target satellite.

After performing the processing in steps D5 to D9 concerning all the acquisition target satellites, the CPU 25 ends the processing of the loop E (step D11). Thereafter, the CPU 25 performs GPS location calculation processing using pseudo distances calculated concerning the acquisition target satellites in step D9 and calculates the location of the cellular phone 1 (step D13). Since details of location calculation using the pseudo distances are publicly-known in the past, detailed explanation of the details is omitted.

Subsequently, the CPU 25 outputs the location calculated in the GPS location calculation processing to the host CPU 30 (step D15). The CPU 25 determines whether to end the position calculation (step D17). When the CPU 25 determines not to end the location calculation yet (No in step D17), the CPU 25 returns to step D1. When the CPU 25 determines to end the location calculation (Yes in step D17), the CPU 25 ends the baseband processing.

2-3. Operational Effects

In the satellite-signal acquiring unit 21 of the baseband processing circuit unit 20, a reception signal output from the RF receiving circuit unit 11 is integrated by the reception-signal-integration processing circuit unit 211. Specifically, the reception signal is sampled at every one clock, which is a sampling time interval, and plural sampling data are acquired. By using a set of sampling data at different code periods obtained by time-dividing the reception signal at an assumed period of a CA code that is a spread code of a GPS satellite signal, a period shift coefficient representing a period shift between a true period of the CA code and the assumed period is calculated. The reception signal is integrated by using the period shift coefficient.

The period shift is a difference between the true period and the assumed period of the CA code. A coefficient representing the period shift can be calculated by using a set of sampling data at different assumed periods among the set of sampling data obtained by time-dividing the reception signal of the GPS satellite signal at the assumed period of the CA code. An appropriate integrated reception signal, which takes into account the phase shift, can be obtained by integrating the reception signal using the period shift coefficient.

Specifically, the reception signal is sampled at every one clock, which is the sampling time interval, to acquire M+1 sampling data per one code period. For example, with the zeroth code period set as a reference code period, a period shift coefficient is calculated concerning each of the code periods by using sampling data (first reception signal portions) at the reference code period and sampling data (second reception signal portions) at the other N code periods. When the sampling data of the N+1 code periods including the reference code period and the other code period are integrated, the sampling data are integrated by using period phase coefficients of the corresponding code periods.

When the sampling data are integrated, an error component due to the period shift can be removed by multiplying the sampling data with the period shift coefficients in advance. A signal suitable for correlation processing with amplitude (power) multiplied by a constant can be obtained by integrating a signal with the error component due to the period shift removed. In other words, this means that a high-quality integrated reception signal not including the error component due to the phase shift can be obtained by integrating, using the phase shift coefficients, a reception signal of a GPS satellite signal from which a carrier wave is not removed. Since the removal of the carrier wave is unnecessary, it is unnecessary to provide a carrier reproducing unit in the baseband processing circuit unit 20. Therefore, simplification of a GPS receiving circuit can be realized.

3. Modifications 3-1. Applied System

In the embodiment, the acquisition of a GPS satellite signal is explained as an example. However, the invention can also be applied to a receiver that receives a signal other than the GPS satellite signal. In other words, the invention can be applied to any receiver as long as the receiver integrates a reception signal of a satellite signal spread and modulated by a spread code and applies the correlation processing to the integrated signal to acquire the satellite signal.

3-2. Electronic Apparatus

In the example explained in the embodiment, the invention is applied to the cellular phone that is a type of the electronic apparatus. However, the electronic apparatus to which the invention can be applied is not limited to this. For example, the invention can also be applied to other electronic apparatuses such as a car navigation system and a portable navigation system, a personal computer, a PDA (Personal Digital Assistant), and a watch.

3-3. Satellite Location Calculating System

In the embodiment, as a satellite location calculating system, the GPS is explained as an example. However, the satellite location calculating system may be a WAAS (Wide Area Augmentation System), a QZSS (Quasi Zenith Satellite System), a GLONASS (GLObal NAvigation Satellite System), and a GALILEO.

3-4. Period Shift Coefficient Calculation Processing

In the explanation of the embodiment, the M+1 multiplication results "$r_{0,m} \cdot \{r_{n,m}\}^*$" are acquired by multiplying together the sampling data "$r_{0,m}$" and the complex conjugate "$\{r_{n,m}\}^*$" of the sampling data with the sampling numbers "m=0 to M" set in order. The M+1 multiplication results "$r_{0,m} \cdot \{r_{n,m}\}^*$" are averaged to be set as the period shift coefficient "$S_n$" of the nth code period. However, a period shift coefficient may be calculated as explained below. The period shift coefficient "$S_n$" is calculated by using sampling data as one or two or more reception signal portions arbitrarily selected concerning the code periods rather than using a set of all sampling data in the code periods.

When sampling data of arbitrarily selected L (1≤L≤M+1) are used, the period shift coefficient "$S_n$" can be calculated in the same manner by averaging L multiplication results concerning the selected respective sampling numbers. For example, when sampling data of arbitrarily selected one sampling number "m" is used, the period shift coefficient "$S_n$" only has to be calculated according to the following Formula (7).

$$S_n = r_{0,m}(t) \cdot \{r_{n,m}(t + nT_{CA})\}^* \quad (7)$$
$$= CA_{0,m}(t) \cdot e^{i\omega t} \cdot CA_{n,m}(t + nT_{CA}) \cdot e^{-i\omega t} \cdot e^{-i\omega n T_{CA}}$$
$$= e^{-i\omega n T_{CA}}$$

3-5. Reception Signal Integration Processing

In the explanation of the embodiment, the reception-signal-integration processing circuit unit 211 performs the integration of the reception signal as the digital signal processing in terms of software. However, the integration of the reception signal can also be performed by using a digital circuit including a circuit element such as a logic circuit rather than being performed in terms of software.

The entire disclosure of Japanese Patent Application No. 2009-294831, filed on Dec. 25, 2009 is expressly incorporated by reference herein.

What is claimed is:

1. A reception signal integrating method comprising:
    calculating, by a processor or a digital circuit, when a reception signal of a satellite signal is time-divided at an assumed period obtained by estimating code period time of a spread code of the satellite signal, a coefficient representing a period shift between a true period and the assumed period of the spread code using first portions and second portions having an assumed period different from that of the first portions in the reception signal; and
    integrating the reception signal using the coefficient.

2. The reception signal integrating method according to claim 1, wherein the integrating the reception signal is generating, by multiply accumulating the first and second portions and the coefficient, a signal obtained by integrating the reception signal.

3. The reception signal integrating method according to claim 1, wherein
    the calculating the coefficient includes calculating the coefficient concerning each of the second portions different from one another by a plurality (n; n is a natural number) of the assumed periods in the reception signal, and
    the integrating the reception signal includes integrating, in integrating each of the second reception signal portions different by the plurality (n) of the assumed periods, the second reception signal portion using the coefficient corresponding thereto.

4. The reception signal integrating method according to claim 1, wherein the calculating the coefficient includes calculating the coefficient using signal portions at the same timings in the assumed period in the first portions and the second portions.

5. The reception signal integrating method according to claim 1, wherein the calculating the coefficient includes calculating the coefficient by multiplying together the first portions and the complex conjugate of the second portions.

6. The reception signal integrating method according to claim 4, wherein the calculating the coefficient includes:
    multiplying together signal portions at different timings in the assumed period in the first portions and the complex conjugate of signal portions at corresponding same timings in the nth (n is a natural number) second portion; and
    setting an average of results of the multiplication of the timings obtained concerning the nth second portion as a coefficient of the first portions and the nth second portions.

7. The reception signal integrating method according to claim 1, wherein the integrating the reception signal includes integrating, using the coefficient, the reception signal from which a carrier wave of the satellite signal is not removed.

8. A receiver comprising:
    a calculating unit that calculates, in receiving a satellite signal, when a reception signal of the satellite signal is time-divided at an assumed period obtained by estimating code period time of a spread code of the satellite signal, a coefficient representing a period shift between a true period and the assumed period of the spread code using first portions and second portions having an assumed period different from that of the first portions in the reception signal;
    an integrating unit that integrates the reception signal using the coefficient;
    a correlating unit that performs correlation processing for a signal integrated by the integrating unit; and
    an acquiring unit that acquires the satellite signal on the basis of a result of the correlation processing.

* * * * *